United States Patent [19]

Tole et al.

[11] Patent Number: 4,464,961
[45] Date of Patent: Aug. 14, 1984

[54] BATTERY PLATE STRIP DIVIDING APPARATUS

[75] Inventors: James M. Tole, Watervliet; Ned L. Stauffer, St. Joseph, both of Mich.

[73] Assignee: Mac Engineering & Equipment Co., Inc., Benton Harbor, Mich.

[21] Appl. No.: 324,800

[22] Filed: Nov. 25, 1981

[51] Int. Cl.³ .......................... B23D 25/12; B26D 1/62
[52] U.S. Cl. ........................................ 83/346; 83/343; 83/903; 83/920; 83/423; 83/302
[58] Field of Search ................. 83/346, 302, 903, 920, 83/343, 423

[56] References Cited

U.S. PATENT DOCUMENTS 3,964,356  6/1976  Dineen ................................. 83/920
4,241,629 12/1980  McDowell ........................... 83/903

Primary Examiner—Donald R. Schran
Attorney, Agent, or Firm—Michael, Best & Friedrich

[57] ABSTRACT

Disclosed herein is apparatus for cutting a strip of battery plate material into a plurality of battery plates, which strip of battery plate material includes a series of longitudinally evenly spaced apertures, and which apparatus comprises a plurality of support rollers rotatably mounted on a frame, an endless belt trained around the support rollers on an endless path, which belt includes an inner surface and an outer surface having thereon a plurality of longitudinally evenly spaced lugs adapted, when the strip is overlayed on the belt, to engage the strip apertures for advancing the strip in common with advancement of the belt, sprocket teeth on at least one of the support rollers and a plurality of apertures on the endless belt engaged by the sprocket teeth for advancing the belt along the endless path, a cutter roller mounted on the frame for rotation and for translation toward and away from the belt, which cutter roller has, on the periphery thereof, cutting knives for severing the strip into plates in response to passage of the strip between the cutter roller and the belt and in response to rotation of the cutter roller, a drive for rotating the cutter roller such that the rate of peripheral travel of the cutting knives is substantially equal to the rate of advancement of the belt, and a pneumatic cylinder yieldably urging the cutter roller toward the belt.

13 Claims, 7 Drawing Figures

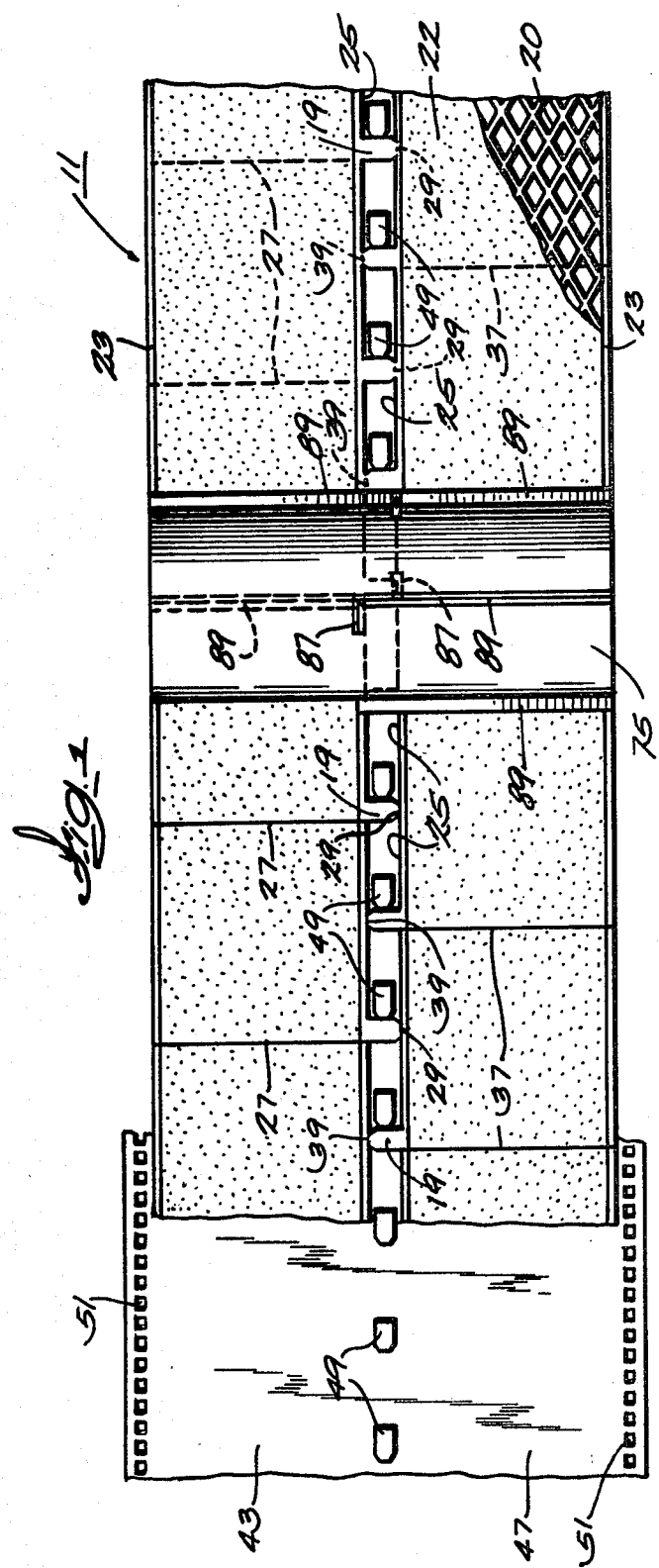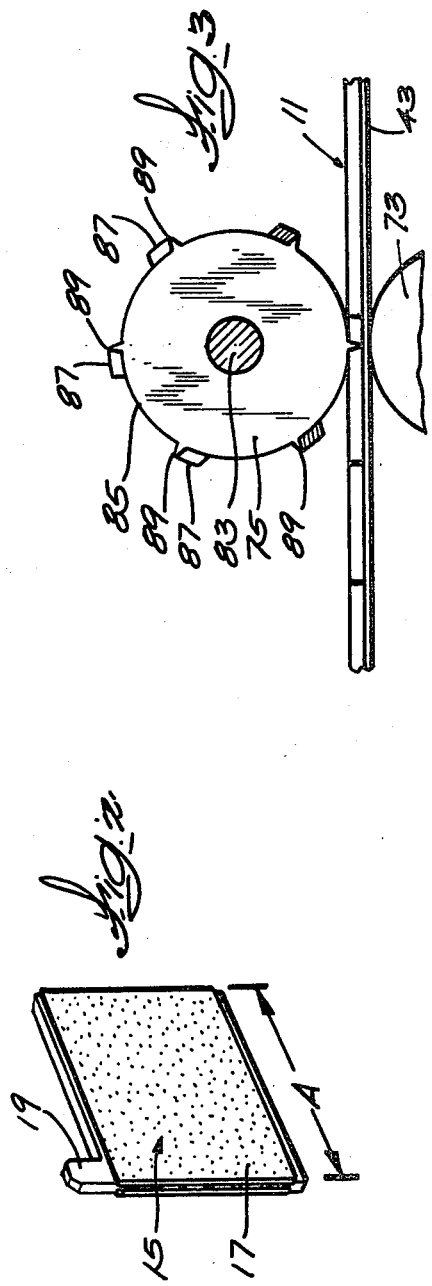

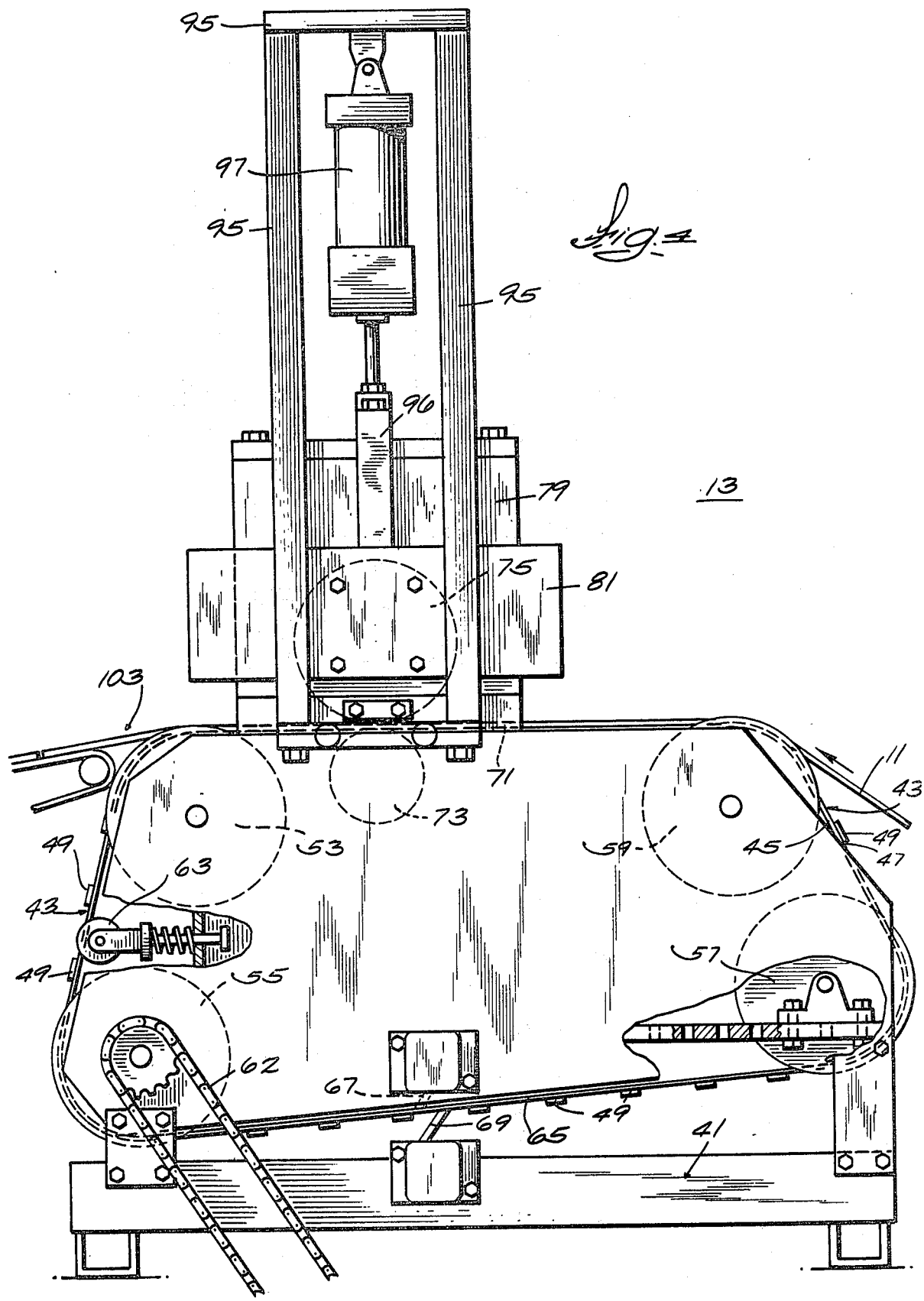

BATTERY PLATE STRIP DIVIDING APPARATUS

BACKGROUND OF THE INVENTION

The invention relates to arrangements for cutting a strip of battery plate material into battery plates.

SUMMARY OF THE INVENTION

The invention provides apparatus for cutting a strip of battery plate material into a plurality of battery plates, which strip of battery plate material includes a series of longitudinally evenly spaced apertures, and which apparatus comprises a plurality of support rollers rotatably mounted on a frame, an endless belt trained around the support rollers on an endless path, which belt includes an inner surface and an outer surface having thereon a plurality of longitudinally evenly spaced lugs adapted, when the strip is overlayed on the belt, to engage the strip apertures for advancing the strip in common with advancement of the belt, drive means on at least one of the support rollers and on the endless belt for advancing the belt along the endless path, a cutter roller mounted on the frame for rotation and for translation toward and away from the belt, which cutter roller has, on the periphery thereof, cutting means for severing the strip into plates in response to passage of the strip between the cutter roller and the belt and in response to rotation of the cutter roller, means for rotatably driving the cutter roller such that the rate of peripheral travel of the cutting means is substantially equal to the rate of advancement of the belt, and means for yieldably urging the cutter roller toward the belt.

In one embodiment of the invention, the lugs are also adapted, when the strip is overlayed on the belt, to engage the strip apertures for laterally aligning the strip relative to the belt.

In one embodiment of the invention, the cutting means includes a series of cutting knives which extend arcuately on the cutter roller periphery and which are adapted to cut the strip between the apertures therein, and a plurality of cutting knives which extend axially on the cutter roller and which are adapted to cut the strip between the apertures therein and the laterally spaced side edges of the strip.

In one embodiment of the invention, the belt advancing means includes a series of apertures in the belt, sprocket teeth located on the one support roller and in engagement with the belt apertures, and means for rotating the one support roller.

In one embodiment of the invention, the apparatus further includes means for adjustably limiting movement of the cutter roller toward the belt.

In one embodiment of the invention, the cutter roller is mounted on the frame by means including an axle shaft, a bearing supporting the axle shaft, a bearing block supporting the bearing, a guideway guidingly engaging the bearing block for movement toward and away from the belt, and the means for adjustably limiting movement of the cutter roller toward the belt includes a stop adjustably supported in position for engaging the bearing block to limit movement thereof toward the belt, and means for adjustably locking the stop in adjusted position.

In one embodiment of the invention, the drive roller and the cutter roller include means for varying the diameters thereof.

In one embodiment of the invention, the apparatus further includes means for accommodating the apparatus to strips with differing spacing between the apertures, which accommodating means includes sprocket teeth on the one support roller, means for adjustably radially locating the teeth so as to vary the pitch spacing between the sprocket teeth, means for varying the length of the endless path including means for adjustably locating one of the support rollers, means for varying the diameter of the cutter means, and means for adjustably limiting movement of the cutter roller toward the belt.

In one embodiment of the invention, the apparatus further includes an anvil mounted on the frame adjacent to the inner surface of the belt and located in opposing relation to the cutter roller.

In one embodiment of the invention, the anvil is a roller.

In one embodiment of the invention, the apparatus further includes brush means engageable with the inner and outer surfaces of the belt.

Other features and advantages of the embodiments of the invention will become known by reference to the following general description, claims and appended drawings.

IN THE DRAWINGS

FIG. 1 is a partially broken away fragmentary top view of an endless belt and an overlaid strip of battery plate material.

FIG. 2 is a perspective view of a battery plate cut from the strip shown in FIG. 1.

FIG. 3 is a fragmentary end view illustrating the cutting of the battery plate material strip into battery plates.

FIG. 4 is a partially schematic and partially broken away end view of apparatus for cutting the strip overlaid on the belt into battery plates.

Figure 5:
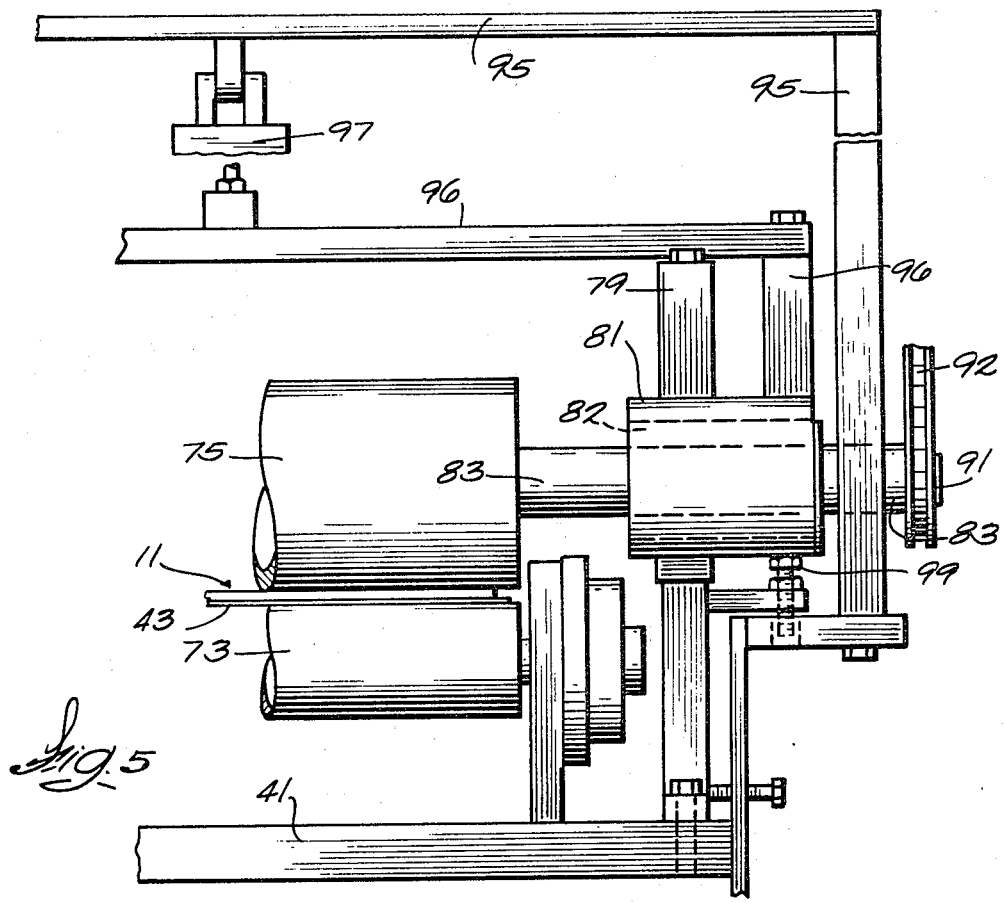
FIG. 5 is an enlarged, fragmentary elevational view of a portion of the apparatus shown in FIG. 4.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 of the drawings is an elongated battery plate strip 11 which is adapted to be fed to a device or apparatus 13 shown in FIG. 4 for cutting or dividing the strip 11 into a plurality of battery plates 15, one of which is shown in FIG. 2. As shown in FIG. 2, the battery plate 15 includes a main body portion 17 having a width A and a lug 19.

The plate strip 11 can be fabricated in various ways and is preferably formed of a substrata 20 of expanded lead or lead alloy having coated thereon a paste 22 which is commonly employed in the art. The plate strip 11 includes, along the lateral margins thereof, edges 23 which are of lesser thickness than the laterally inner area of the strip 11. Located centrally of the strip 11, is a series of longitudinally and evenly spaced apertures 25. The plate strip 11 is adapted to be slit or cut along the lateral or transverse dotted lines 27 and along the longitudinal dotted lines 29 to divide or cut the plates 15 from one lateral side of the strip 11. The strip 11 is also adapted to be slit or cut along the lateral or transverse dotted lines 37 and along the longitudinal dotted lines 39 to divide or cut the plates 15 from the other lateral side of the strip 11.

The apparatus or device 13 comprises (see especially FIG. 4) a suitable frame 41, together with an endless metallic belt 43 (shown also in FIG. 1) which is preferably constructed of stainless steel and which includes an inner surface 45, and an outer surface 47 having fixed thereon a plurality of longitudinally and evenly spaced lugs 49 adapted to fit into the apertures 25 in the plate strip 11 so as to laterally align the strip 11 with the belt 43 and so as to engage the forward edges of the apertures 25 so that advancement of the belt 43 causes common advancement of the plate strip 11.

Laterally outwardly of the belt area which engages the strip 11, the belt 43 is provided, on each lateral edge, with a plurality of spaced apertures 51 which form part of a belt advancing means 43 which will be referred to hereinafter.

Mounted on the frame 41 is a belt mounting means which is designed to support the belt for travel along an endless path. The belt mounting means includes (see FIG. 4) rollers 53, 55, 57 and 59. At least one of the rollers, the roller 55 in the illustrated construction, constitutes a drive sprocket and includes (see FIG. 7) a plurality of sprocket teeth 61 which are engageable with the apertures 51 along the side margins of the belt 43 so as to drive the belt 43 along the endless path in response to rotation of the drive roller 55. Any suitable means, including a fragmentarily illustrated drive chain 62 can be employed to rotate or drive the drive roller 55 so as to drive the belt 43 at a predetermined speed.

Also mounted on the frame 41 is a suitably spring biased idle roller 63 (see FIG. 4) adapted to remove slack from the belt 43 along the endless path around the rollers 53, 55, 57 and 59.

The rollers 55 and 57 define a lower run 65 adjacent to which are mounted, on each side of the belt 43, respective brushes 67 and 69 adapted to respectively engage the inner and outer surfaces 45 and 47 of the belt 43 so as to remove therefrom any debris which might otherwise tend to accumulate on the belt 43.

The rollers 53 and 59 also define an upper run 71 adjacent to which there is rotatably mounted on the frame 41 an anvil roller 73 which is engageable with the inner belt surface 45 for support thereof. Although the anvil roller 73 could be power driven, in the disclosed construction, the inner surface 45 of the belt 43 engages the roller 73 and travel of the belt 43 along its endless path frictionally causes anvil roller rotary movement.

Located adjacent the outer belt surface 47 and along the run 71 in opposition to the anvil roller 73 is a cutter roller 75 which is mounted by the frame 41 for rotation and for movement toward and away from the endless belt 43. In this last regard, the frame 41 includes a pair of laterally spaced, suitably constructed guideways 79 which receive respective elongated bearing blocks 81 carrying trunions or bearings 82 which, in turn, receive the cutting roller axle 83.

Supported on the outer periphery 85 of the cutting roller 75 is (see FIG. 3) a plurality of cutting means which extend radially outwardly from the roller periphery 85 and which include circumferential slitters or knives 87 adapted to cut or separate along the lines 29 and 39, as well as lateral or transverse slitters or knives 89 adapted to cut or separate along the lines 27 and 37. While other arrangements could be employed, in the disclosed construction, the cutter roller 75 has, on the outer periphery thereof, cutting knives and slitters adapted to cut six plates 15 from the plate strip 11, three from each side for each cycle of rotation of the cutting roller 75.

In order to rotate the cutter roller 75 in unison with advancement of the belt 43 and in constant relation thereto, the cutter roller 75 has attached thereto a sprocket 91 which is rotated or driven by suitable means, including a fragmentarily illustrated sprocket claim 92, so that the peripheral speed of the tip of the cutting edges of the knives or slitters 87 and 89 is the same as the speed of advancement of the belt 43. Any suitable drive means can be employed for rotating the cutting roller 75 in unison with the endless belt 43 in constant speed relation.

Means are provided for forcing or urging the cutter roller 75 toward the belt 43 so as to slit or cut the plate strip 11 into battery plates 15. While various arrangements can be employed, in the illustrated construction, such means comprises formation of the frame 41 with a suitable primary bridge 95 and by employment of one or more suitable pneumatic or hydraulic cylinders 97 which extend between the primary bridge 95 and a secondary bridge 96 fixed to the bearing blocks 81 so as to urge the cutter roller 75 radially toward the belt 43 with sufficient force to sever the plate strip 11.

Means are provided for limiting inward displacement of the cutter roller 75 so as to prevent undue penetration of the knives or cutters 87 and 89 into the belt 43 and so as to space the outer periphery 85 of the cutter roller 75 from the plate strip 11 during such intervals of cutter roller rotation when there is no engagement between the knives 87 and 89 and the plate strip 11. While various arrangements can be employed, in the illustrated construction, such means comprises, for each of the bearing blocks 81, a stop 99 which is adjustably located in the path of bearing block movement, which constitutes an adjustably located bolt, and which limits radially inward travel of the associated bearing block 81, and thus the knives 87 and 89, in the direction toward the belt 43, while permitting radially outward movement of the cutter roller 75 in the event the knives 87 and 89 encounter greater resistance to radially inward movement than that normally associated with severing of the plate strip 11.

Any suitable means can be provided for causing removal of the severed plates 15 from the belt 43. In the disclosed construction, suitable means (not shown) is provided for causing the severed plates to travel from the belt 43 onto a further conveyor 103 in response to travel of the endless belt 43 over the roller 53.

Any suitable means (not shown) can be provided for guiding the plate strip 11 for movement onto the belt 43 so that the lugs 49 enter into the apertures 25 and so that the plate strip 11 lays on the belt 43.

In operation, as the plate strip 11 advances with the belt 43, the cutter roller 75 rotates so as to cause the knives 87 and 89 to slit the plate strip 11 along the lines 27, 29, 37 and 39. The stops 99 serve to prevent excessive penetration of the knives 87 and 89 into the belt 43 and to maintain separation of the outer periphery 85 of the cutter roller 75 from the plate strip 11 when the knives 87 and 89 are not engaged with the belt 43. The cylinder 97 urges the cutter roller 75 to effect severance of the plate strip 11 by the knives 87 and 89 as the belt 43 advances and the cutter roller 75 rotates.

It is especially noted that the apparatus or device 13 is particularly adapted to accommodate dividing or cutting of battery plate strips 11 into plates of differing widths. In this regard, each plate 11 of different width requires an endless belt with a particular lug spacing and therefor of differing length. In addition, a different cutter roller is required for each plate width in order to accommodate difference in the widths of the plates 11 being cut on the belt 43. Further in addition, as the rotary input to the belt drive roller 55 and to the cutter roller 25 is retained constant, notwithstanding changes in plate width, adjustments must be made to the drive arrangement between the belt 43 and the drive roller 55. More particularly, as the distance between strip drive apertures 25 varies in accordance with the plate width, so too, the diameter of the drive roller 55 and cutter roller 75 varies, as does the pitch distance between adjacent sprocket teeth 61 driving the belt 43. In this last regard, the mounting of the rollers 55 and 75 is such as to permit interchangeability of rollers of different diameters on the same supports. In addition, the roller 57 is mounted on the frame 41 by suitable arrangements to afford gross adjustment in the location thereof so as to accommodate endless belts of different lengths adapted for usage in connection with different plate widths.

Figure 6:
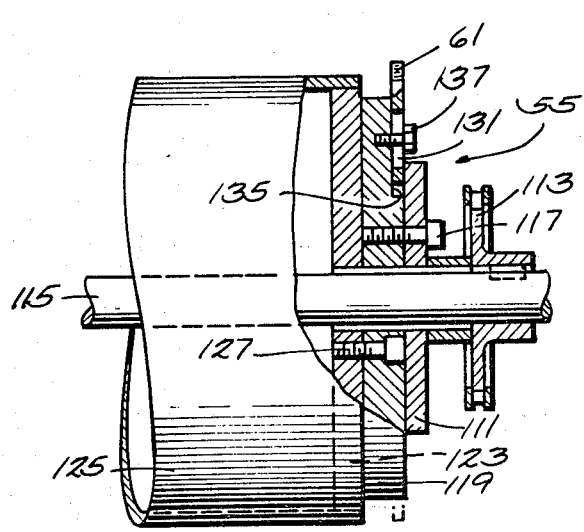
FIG. 6 is a fragmentary view, partially broken away and in section, of one of the rollers incorporated in the apparatus shown in FIG. 4.

More particularly, in connection with accommodation to battery plates of varying widths, and with respect to the drive roller 55 and the cutter roller 75, as shown in FIG. 6, the drive roller 55 includes a base disc 111 which is rotatable in common with the drive sprocket 113 and with an axle 115.

Fixedly connected to the base disc 111 by suitable fasteners, such as the bolts 117, is a mounting disc or plate 119. In turn, the mounting disc or plate 119 is fixedly connected, by suitable fasteners, such as the bolts 121, to the end plate 123 of a cylindrical roll 125 having the desired diameter. As a result of the foregoing construction, rolls of varying diameters to accomodate varying battery plates widths can be readily substituted in the roller 55. A similar construction can be employed to substitute knife bearing rolls of varying diameters in the cutter roller 75.

Figure 7:
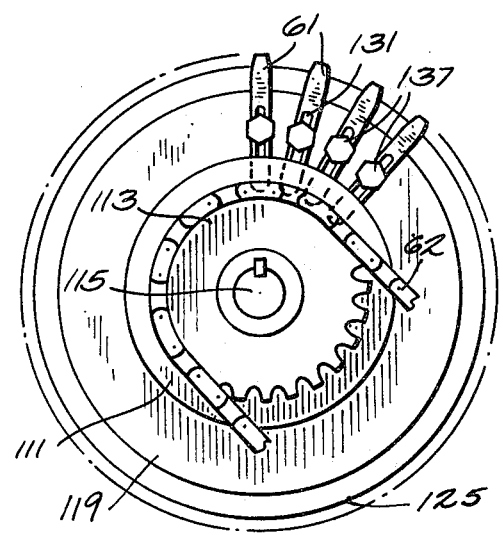
FIG. 7 is an end view of the roller shown in FIG. 6.

In addition, and as shown best in FIGS. 6 and 7, the belt drive sprockets 61 include radial slots 131 and are located in suitably radially extending recesses 135 in the mounting disc or plate 119. The teeth are radially adjustably mounted to vary their radially extent, and hence to accommodate variations in spacing between adjacent belt sprocket holes or apertures 51, by means of bolts 137 which pass through the slots 131 in clamping relation thereto and which are threadably received in the mounting disc or plate 119.

Various of the features of the invention are set forth in the following claims:

We claim:

1. Apparatus for cutting a strip of battery plate material into a plurality of battery plates, the strip of battery plate material having a width and a thickness, which strip of battery plate material includes a series of longitudinally evenly spaced apertures, which apparatus comprises a frame, a plurality of support rollers rotatably mounted on said frame, an endless belt trained around said support rollers on an endless path, said belt including an inner surface and an outer surface having thereon a plurality of longitudinally evenly spaced lugs adapted, when the strip is overlayed on said belt, to engage the strip apertures for advancing the strip in common with advancement of said belt, said belt being sufficiently wide that substantially all of said strip is supported by said belt, drive means on at least one of said support rollers and said endless belt for advancing said belt along said endless path, a cutter roller mounted on said frame for rotation and for translation toward and away from said belt, said cutter roller having, on the periphery thereof, cutting means for cutting the strip into battery plates in response to passage of the strip between said cutter roller and said belt and in response to rotation of said cutter roller, said cutting means including knives supported by said roller, said knives extending radially from said roller to said belt such that said knives cut through said strip but wherein said knives do not cut said belt, means for rotatably driving said cutter roller such that the rate of peripheral travel of said cutting means is substantially equal to the rate of advancement of said belt, and means for yieldably urging said cutter roller toward said belt such that the distance between said periphery of said roller and said belt is substantially the thickness of the strip of battery plate material.

2. Apparatus in accordance with claim 1 wherein said lugs are also adapted, when the strip is overlayed on said belt, to engage the strip apertures for laterally aligning the strip relative to said belt.

3. Apparatus in accordance with claim 1 wherein said drive means also includes means for laterally aligning said belt with said support rollers.

4. Apparatus in accordance with claim 1 wherein said cutting knives includes a series of cutting knives which extend arcuately on the periphery of said cutter roller and which are adapted to cut the strip between the apertures therein, and a plurality of cutting knives which extend axially on said cutter roller and which are adapted to cut the strip between the apertures therein and the laterally spaced side edges of the strip.

5. Apparatus in accordance with claim 1 wherein said belt advancing means includes a series of apertures in said belt, sprocket teeth located on said one support roller and in engagement with said belt apertures, and means for rotating said one support roller.

6. Apparatus in accordance with claim 1 and further including means for adjustably limiting movement of said cutter roller toward said belt.

7. Apparatus in accordance with claim 6 wherein said cutter roller is mounted on said frame by means including an axle shaft, a bearing supporting said axle shaft, a bearing block supporting said bearing, a guideway guidingly engaging said bearing block for movement toward and away from said belt, and wherein said means for adjustably limiting movement of said cutter roller toward said belt includes a stop adjustably supported in position for engaging said bearing block to limit movement thereof toward said belt, and means for adjustably locking said stop in adjusted position.

8. Apparatus in accordance with claim 1 wherein said drive roller and said cutter roller include means for varying the diameters thereof.

9. Apparatus in accordance with claim 1 and further including means for accommodating said apparatus to strips with differing spacing between the apertures, said accommodating means including sprocket teeth on said one support roller, means for adjustably radially locating said teeth so as to vary the pitch spacing between said sprocket teeth, means for varying the length of said endless path including means for adjustably locating one of said support rollers, means for varying the diameter of said cutter means, and means for adjustably limiting movement of said cutter roller toward said belt.

10. Apparatus in accordance with claim 1 and further including an anvil mounted on said frame adjacent to said inner surface of said belt and located in opposing relation to said cutter roller.

11. Apparatus in accordance with claim 10 wherein said anvil is a roller.

12. Apparatus in accordance with claim 1 and further including brush means engageable with said inner and outer surfaces of said belt.

13. Apparatus in accordance with claim 1 wherein said cutting means is arranged to cut the strip both in a longitudinal direction at longitudinally evenly spaced intervals and in a lateral direction at longitudinally evenly spaced intervals.

* * * * *